(12) United States Patent
Aggarwal et al.

(10) Patent No.: US 6,349,309 B1
(45) Date of Patent: Feb. 19, 2002

(54) SYSTEM AND METHOD FOR DETECTING CLUSTERS OF INFORMATION WITH APPLICATION TO E-COMMERCE

(75) Inventors: Charu Chandra Aggarwal, Yorktown Heights; Philip Shi-Lung Yu, Chappaqua, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/317,472

(22) Filed: May 24, 1999

(51) Int. Cl.[7] .............................................. G06F 17/30
(52) U.S. Cl. ............................. 707/200; 707/2; 707/5; 707/6; 382/190
(58) Field of Search .......................... 707/5, 2, 3, 6, 707/200; 382/190

(56) References Cited

U.S. PATENT DOCUMENTS

| | | | | |
|---|---|---|---|---|
| 5,647,058 A | * | 7/1997 | Agrawal et al. ................ | 707/1 |
| 5,901,244 A | * | 5/1999 | Souma et al. ................ | 382/190 |
| 5,978,788 A | * | 11/1999 | Castelli et al. ................ | 707/2 |
| 5,986,673 A | * | 11/1999 | Martz ........................ | 345/437 |
| 6,048,797 A | * | 4/2000 | Guha et al. .................... | 707/6 |
| 6,094,653 A | * | 7/2000 | Li et al. ....................... | 707/6 |
| 6,122,628 A | * | 9/2000 | Castelli et al. ................ | 707/5 |
| 6,134,541 A | * | 10/2000 | Castelli et al. ................ | 707/2 |

OTHER PUBLICATIONS

D. Fisher, "Knowledge Acquisition via Incremental Conceptual Clustering", Machine Learning 2, pp. 139–172, 1987.

T. Zhang et al., "Birch: An Efficient Data Clustering Method for Very Large Databases", Proceedings of the ACM SIGMOD International Conference on Management of Data, pp. 103–114, Sep. 1996.

R. Ng et al., "Efficient and Effective Clustering Methods for Spatial Data Mining", Proceedings of the 20th International Conference on Very Large Data Bases, pp. 144–155, 1994.

M. Zait et al., "A Comparative Study of Clustering Methods", FGCS Journal, Special Issue on Data Mining, pp. 149–159, 1997.

R. Kohavi et al., "Feature Subset Selection Using the Wrapper Method: Overfitting and Dynamic Search Space Topology", Proceedings of the First International Conference on Very Large Data Bases, pp. 192–197, 1994.

\* cited by examiner

*Primary Examiner*—John Breene
*Assistant Examiner*—Debbie M Le
(74) *Attorney, Agent, or Firm*—F. Chau & Associates, LLP

(57) ABSTRACT

A method of analyzing information in the form of a plurality of data values. The plurality of data values represent a plurality of objects. The plurality of data values are distributed in a data space. A set of features which characterize each of the plurality of objects is identified. The plurality of data values are stored in a database. Each of the plurality of data values corresponds to at least one of the plurality of objects based on the set of features. Ones of the plurality of data values stored in the database are partitioned into a plurality of clusters. A respective orientation associated with a position in data space of data values which are contained in each respective cluster of the plurality of clusters is calculated based on the set of features. If desired, information may be analyzed for finding peer groups in e-commerce applications.

27 Claims, 8 Drawing Sheets

SYSTEM AND METHOD FOR DETECTING CLUSTERS OF INFORMATION WITH APPLICATION TO E-COMMERCE

FIELD OF THE INVENTION

The present invention relates generally to analyzing and searching for information in high-dimensional databases. In particular, related information in a database is partitioned using oriented clusters. Furthermore, the present invention relates to an automated system and method for detecting records in a database that are similar to a user defined target record.

BACKGROUND OF THE INVENTION

It is often desirable to detect sets of related instances in a database that correspond to related information. Instances of information are represented and stored in a database in the form of a set of data values in a multidimensional space. A dimension in the multidimensional space is a feature that characterizes objects represented by the data values. For example, consider an insurance company's database containing customer information. Each customer is an object corresponding to an instance in the database that is a customer profile, or data value, in the multidimensional feature space of the database. Each data value is an n-tuple corresponding to an instance of the features: age, sex, height, weight, salary, of the customer as well as the number of cars owned by the customer. The dimensions of the multidimensional feature space are the features that characterize the customer namely the age, sex, salary, of the customer and number of cars owned by the customer.

The problem of clustering is the problem of finding sets of data values in a multidimensional feature space that are close to each other, in the sense of some metric, measure or the like, with respect to a particular subset of dimensions. A particular subset of dimensions is a subset of the features that characterize the objects represented by data values stored in the database, and is thus associated with a subspace in the multidimensional feature space. The clustering problem is a known problem in the database literature, for example D. Fisher, "Knowledge Acquisition via Incremental Conceptual Clustering", *Machine Learning* 2(2), 1987; T. Zhang, R. Ramakrishnan and M. Livny, "BIRCH: An Efficient Data Clustering Method for Very Large Databases", *Proceedings of the ACM SIGMOD International Conference on Management of Data*, Montreal, Canada, June 1996; R. Ng and J. Han, "Efficient and Effective Clustering Methods for Spatial Data Mining", *Proceedings of the 20th International Conference on Very Large Data Bases*, Santiago, Chile, 1994, pp. 144–155; and M. Zait and H. Messatfa, "A Comparative Study of Clustering Methods", *FGCS Journal, Special Issue on Data Mining*, 1997. The clustering problem has numerous applications that relate to other problems such as segmentation, classification, collaborative filtering/data mining and trend analysis. It is also known that existing algorithm designed to solve the problem of clustering break down in high dimensional feature spaces. The difficulty that arises in high dimensional feature spaces is the inherent sparsity of data values. For example, in the above case when objects represented in the database as customer profiles, there may not be many clusters of customer profiles that are similar (close) with respect to all the features: age, height, weight, sex, salary, number of cars, etc. Thus, when the number of features is high the data may become sparse.

In high dimensional feature spaces, however, only some of the features may be relevant when finding clusters. Therefore, one approach to handling high dimensional feature spaces is to select closely correlated features, project out or ignore the other features, and find clusters in the corresponding subspace (see, for example, R. Kohavi and D. Sommerfield, "Feature Subset Selection Using the Wrapper Method: Overfitting and Dynamic Search Space Topology," *Proceedings of the First International Conference on Very Large Data Bases*, Santiago, Chile, 1994, pp. 144–155). This approach is problematic, however, as it is difficult to find a single subset of features, i.e. one subspace, in which data values cluster well. In other words, different subsets of data values may cluster better for different subsets of features or subspaces.

The clustering problem has been discussed in the literature of both the statistical and database communities. The emphasis in the statistical community is to find clusters based on precisely defined metrics, while the emphasis in the database community is to produce methods for detecting clusters that work efficiently on large data sets. Two known algorithms for finding clusters in large databases are the BIRCH and CLARANS, see T. Zhang, R. Ramakrishnan and M. Livny, supra, and R. Ng and J. Han, supra.

As explained above, many clustering algorithms do not work efficiently in higher dimensional feature spaces because of the sparsity of the data. In many applications, execution of a clustering algorithm is preceded by feature selection. It is desirable to select particular features so that the data values in the feature space are correlated to each other in the subspace associated with the selected features. Pruning away or projecting out undesirable features reduces the number of uncorrelated features that add noise to the data.

The problem of using traditional feature selection methods is that picking certain features in advance leads to a loss in information. Furthermore, in many data sets, some data values are related with respect to a given set of features and others are correlated with respect other features. Thus, it is often infeasible to prune away or project out too many features without at the same time incurring a substantial loss in information.

In order to illustrate this point, consider the following example. In FIG. 1(a) and FIG. 1(b), two different feature subspaces are illustrated. On each subspace the projection of a set of data values in 3-dimensional feature space is shown. Two patterns of the data emerge: the first pattern corresponds to the cluster 101 of data values in the X-Y plane, while the second pattern corresponds to the cluster 102 of data values in the X-Z plane.

It is advantageous to identify a way of expressing and representing such patterns. Feature pre-selection does not seem an appropriate option, because each feature is relevant to at least one of the clusters. In other words, the "closeness" of data values projected into different subspaces of the 3-dimensional feature space is not uniform with respect to the different features.

In the context of a database of customer profiles that include information about the age, sex, salary, and number of cars, it may be the case that the number of cars owned by a given customer is related in a variety of different patterns depending on whether attention is restricted to customer age or sex or salary or all of the above. Hence, different clusters are found in different subspaces depending on which set of features is considered.

Another problem of using traditional feature selection methods is that clusters are assumed to be aligned with a particular coordinate system. For example, in FIG. 1(a)

cluster 101 is assumed to be aligned with the Z-axis, while in FIG. 1(*b*) cluster 102 is assumed to be aligned with the Y-axis. A more realistic distribution of data values may produce cluster which are oriented along arbitrary subspaces.

It is advantageous to identify a way of expressing and representing clusters along arbitrary orientation. In order to illustrate this point consider the example shown in FIGS. 1(*c*) and 1(*d*). In FIG. 1(*c*) a projected X-Y subspace is illustrated in which cluster 103 is shown oriented along a direction $P_1$, and cluster 101 is shown oriented along direction $P_2$ In FIG. 1(*d*) a projected X-Y subspace is illustrated in which cluster 013 is shown oriented along a direction $P_3$, and cluster 104 is shown oriented along a direction $P_4$.

In the context of a database of customer profiles that include information about the age, height, weight, sex, salary, and number of cars, it may be the case that information about customers may be related along a direction determined by a particular linear combination of salary and age. Hence, different clusters may be found in different subspaces depending on which (oriented) subspace is considered.

SUMMARY OF THE INVENTION

A method of analyzing information in the form of a plurality of data values. The plurality of data values represent a plurality of objects. The plurality of data values are distributed in a data space. A set of features which characterize each of the plurality of objects is identified. The plurality of data values are stored in a database. Each of the plurality of data values corresponds to at least one of the plurality of objects based on the set of features. Ones of the plurality of data values stored in the database are partitioned into a plurality of clusters. A respective orientation associated with a position in data space of data values which are contained in each respective cluster of the plurality of clusters is calculated based on the set of features.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIGS. 1(*c*) and 1(*d*) are additional graphical illustrations of clusters in two different feature subspaces;

DETAILED DESCRIPTION OF THE INVENTION

Figure 1B:
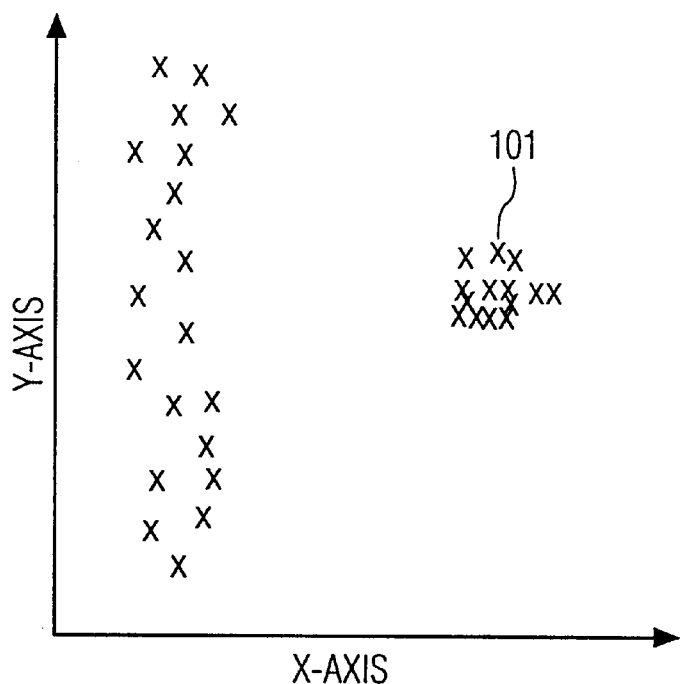
FIGS. 1(*a*) and 1(*b*) are graphical illustrations of clusters in two different feature subspaces.
Figure 1A:
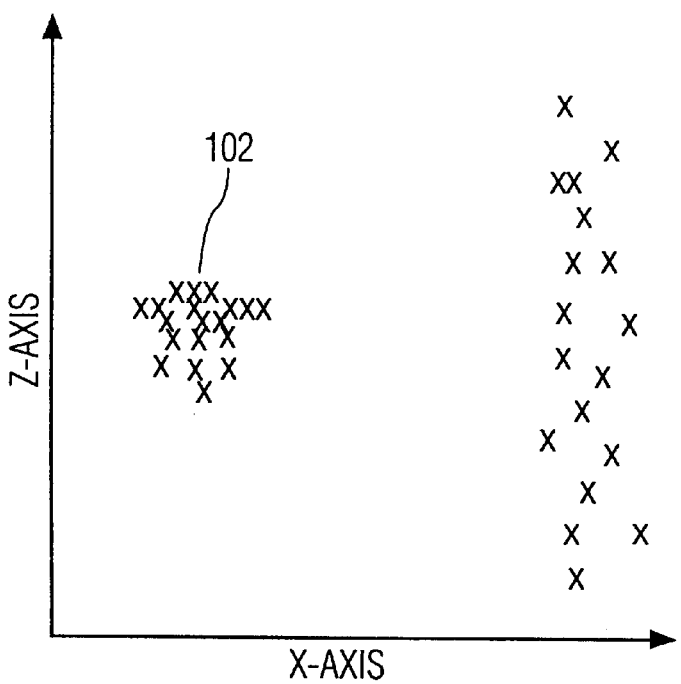
Figure 1C:
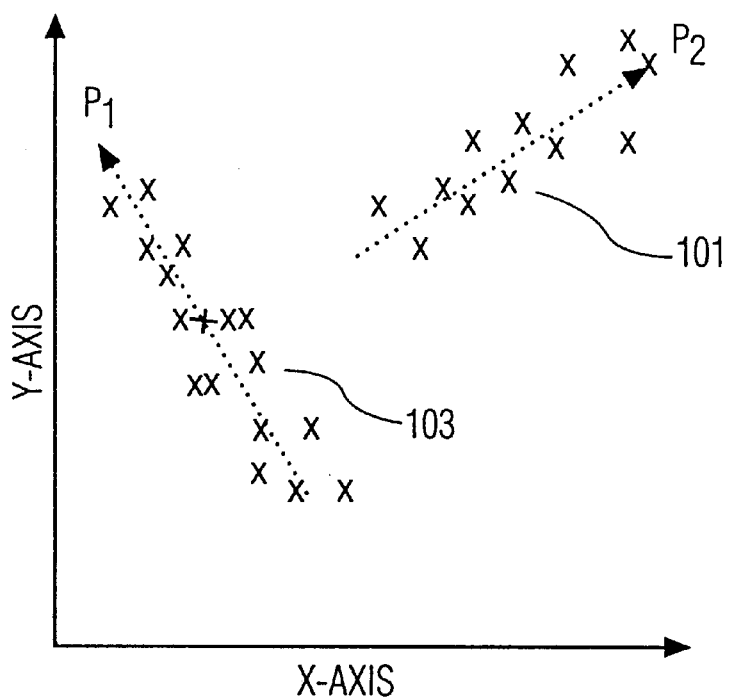
Figure 1D:
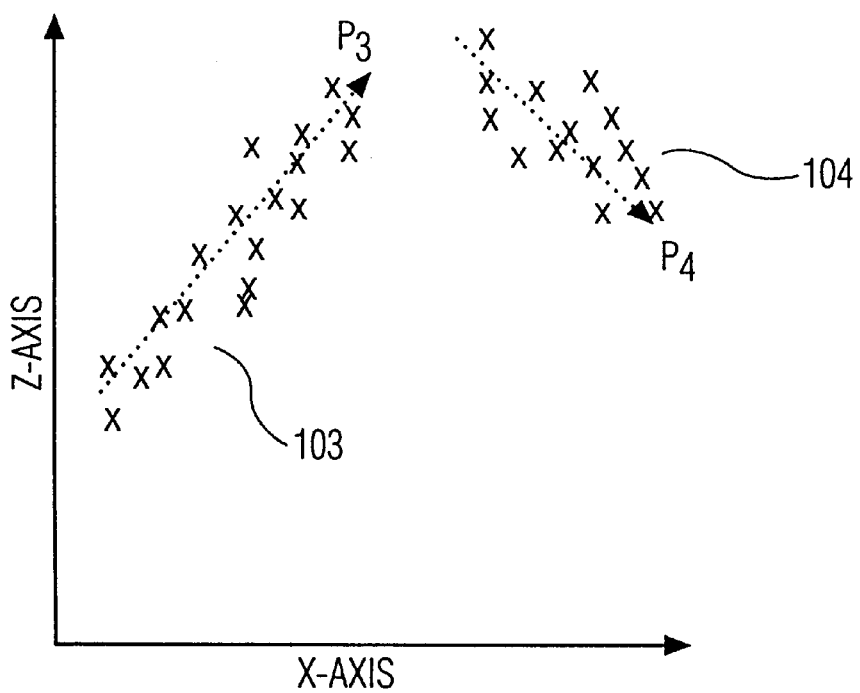
Figure 2:
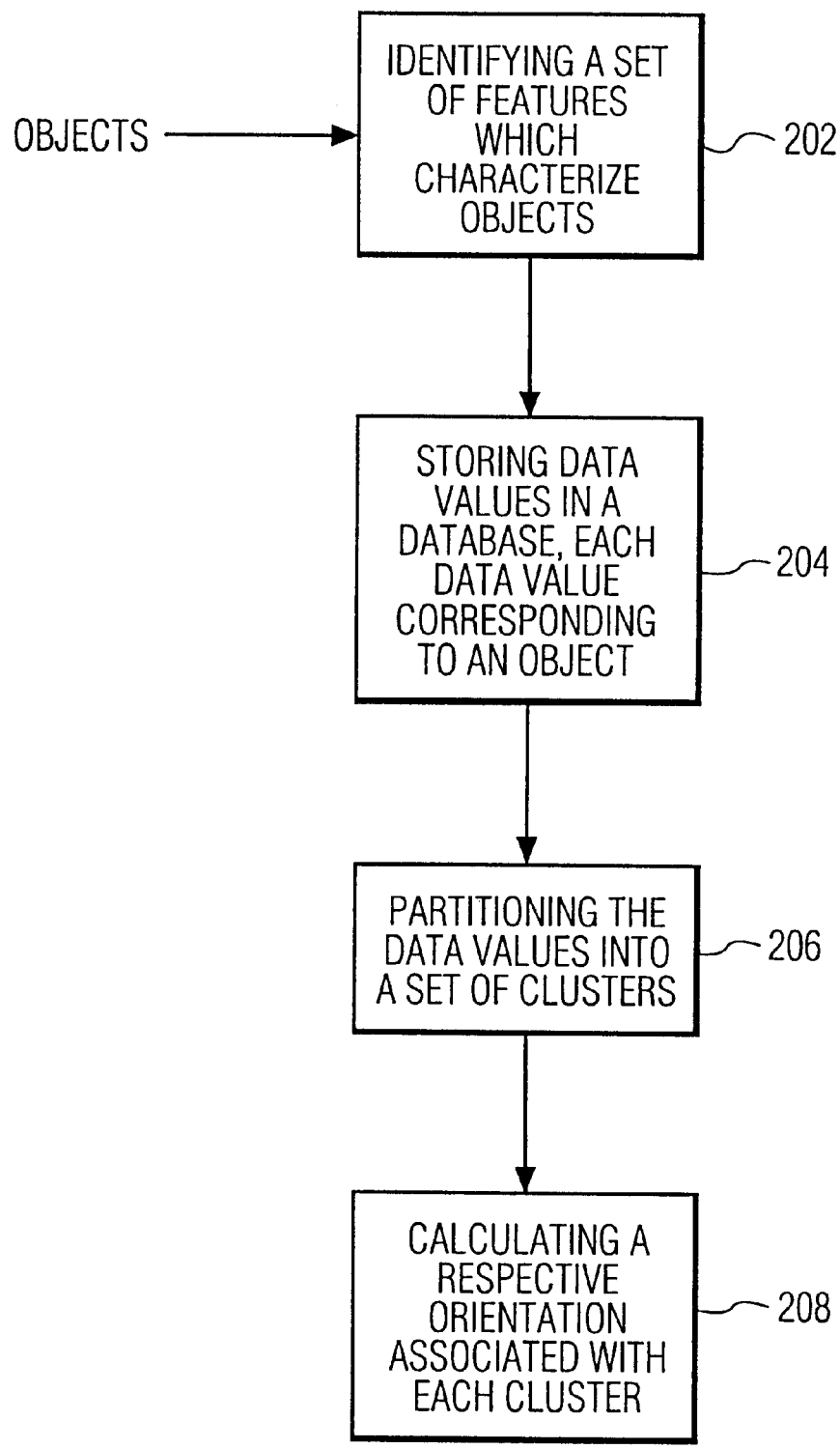
FIG. 2 is a flow chart diagram which is useful for explaining a method of analyzing information in a database in accordance with an exemplary embodiment of the present invention.

FIG. 2 is a flow chart diagram which is useful for explaining a method of analyzing information in a database in accordance with an exemplary embodiment of the present invention. The method summarized by the flow chart diagram of FIG. 2 is a method of analyzing information characterizing a physical plurality of objects collected. A set of features of the physical objects may be identified in step 202. For example, objects may correspond to people, and features characterizing objects may correspond to age, sex, salary, and social insurance number.

In step 204 the information characterizing each object may be stored in a data base as data values. A data value represents an instance of the set of features as measured from a physical object. For example, if objects are people and if the set of features includes sex then instances of sex would be either male or female depending of the particular person. Thus, the set {35, female, 80, 1020003} is an example of a data value representing an instance of the set of features {age, sex, salary, social insurance number} corresponding to a 35 year old female person, with a salary of 80 thousands of a currency, and with social insurance number 001-02-0003. Note that it is herein assumed that all features may be given a numerical value. For example, the instances of sex, male and female may be given numerical values 0, 1 respectively.

In step 206 clusters of information may be to detected by partitioning the set of data values. Consider, for example, a data base belonging to a car insurance agent. The objects in the data base are people and the set of features includes: age, sex, marital status, number of accidents, and year vehicle owned was manufactured. An example of a cluster of information in this scenario may be a first group of people that are close in age and in the number of accidents they have been involved in as well as a second group of people that are close in age and own vehicles manufactured around the same time. Note that the first group of people and the second group of people may be the same, overlapping, or nonintersecting.

A cluster, denoted symbolically by C, is in this context a subset of a set of data values, say V. The set of data values is distributed in a data space. For example, a data space may be a real n dimensional space $\Re$. The data values $p \in C$ are close to each other in the sense of some metric. An oriented cluster is denoted symbolically herein by a pair (C,E), where $C \subseteq V$ is a cluster and E is a set of vectors in a data space to which data values in V belong. The data values $p \in C$ (an oriented cluster) are close to each other in the sense of some metric taken with respect to the (oriented) subspace determined by the vector(s) E. A set of vectors E, associated with a cluster C, and spanning an (oriented) subspace is referred to herein as an orientation. Note that E is not necessarily a subset of a set of features but an arbitrary vector or set of vectors in a data space in which a set of data values V is distributed.

In other words, when deciding whether elements p of a subset of data values C are in some sense close to each other, "closeness" is measured with respect to a (oriented) subspace spanned by the vector(s) E. In a sense, restricting attention to a subspace E is like considering a projection of the subset of data values C onto the subspace spanned by E along with the (induced) metric in that subspace. For example, it may be the case that two people are close with respect to a linear combination of age and in the number of accidents they have been involved in but one of the two owns a much older car than the other. Hence, these two people are the elements of a subset of the set of all people corresponding to data values in a data base. The data values corresponding to these two people combined with the subset of vectors defining an oriented subspace defined by a linear combination of age, and number of accidents form an oriented cluster.

It is possible to define various quantities related to clusters such as, for example, the mass of a cluster, the centroid of a cluster and the radius of a cluster. Let $C=\{x_1, x_2, \ldots, x_m\}$ be the subset of data values of a cluster C. The mass of cluster C is equal to the number of data values in C or the cardinality of C. Thus, the mass of the cluster C is m. The centroid of a cluster is the algebraic average of all the data values in the cluster. Thus, the centroid of the cluster C is given by the linear sum of the data values in C divided by the mass of the cluster C. The radius of the cluster C is the average distance of data values in C from the centroid of the cluster, given a specific distance metric.

Two possible metrics for calculating distances between data values are the Manhattan metric and the Euclidean metric. The Euclidean distance between two data values $q=(q_1, \ldots, q_n)$ and $r=(r_1, \ldots, r_n)$, in a real n-dimensional data space $\Re$, is given by $$\sqrt{\sum_{i=1}^{n} (q_i - r_i)^2} \qquad (1)$$

The Manhattan distance is given by $$\sum_{i=1}^{n} |q_i - r_i| \qquad (2)$$

A method in accordance with the present invention may be implemented with various metrics including the Euclidean metric and the Manhattan distance. In general, the Lp norm induced distance metric between two data values $q=(q_1, \ldots, q_n)$ and $r=(r_1, \ldots, r_n)$ is defined as $$\|q - r\|_p = \left[\sum_{i=1}^{n} |q_i - r_i|^p\right]^{1/p} \qquad (3)$$

The $L_p$ norm induced segmental distance between two data values $m=(m_1, \ldots, m_n)$ and $n=(n_1, \ldots, n_n)$ is defined by $$\frac{\|q - r\|_p}{n} \qquad (4)$$

Thus, the $L_p$ norm induced segmental distance between two data values is an average length.

Clusters of information may be detected, for example, using a seed-based technique. Seed-based techniques involve finding a set of seeds around which clusters may be constructed. The set of seeds is a subset S of the set of data values V. The set of seeds forms a set of "anchor points" around which clusters may be constructed. Once a proper set of seeds, say S, is obtained it may be possible to assign each data value in V (with the possible exception of "outliers") to a seed in S, thereby constructing a corresponding set of clusters.

Figure 3:
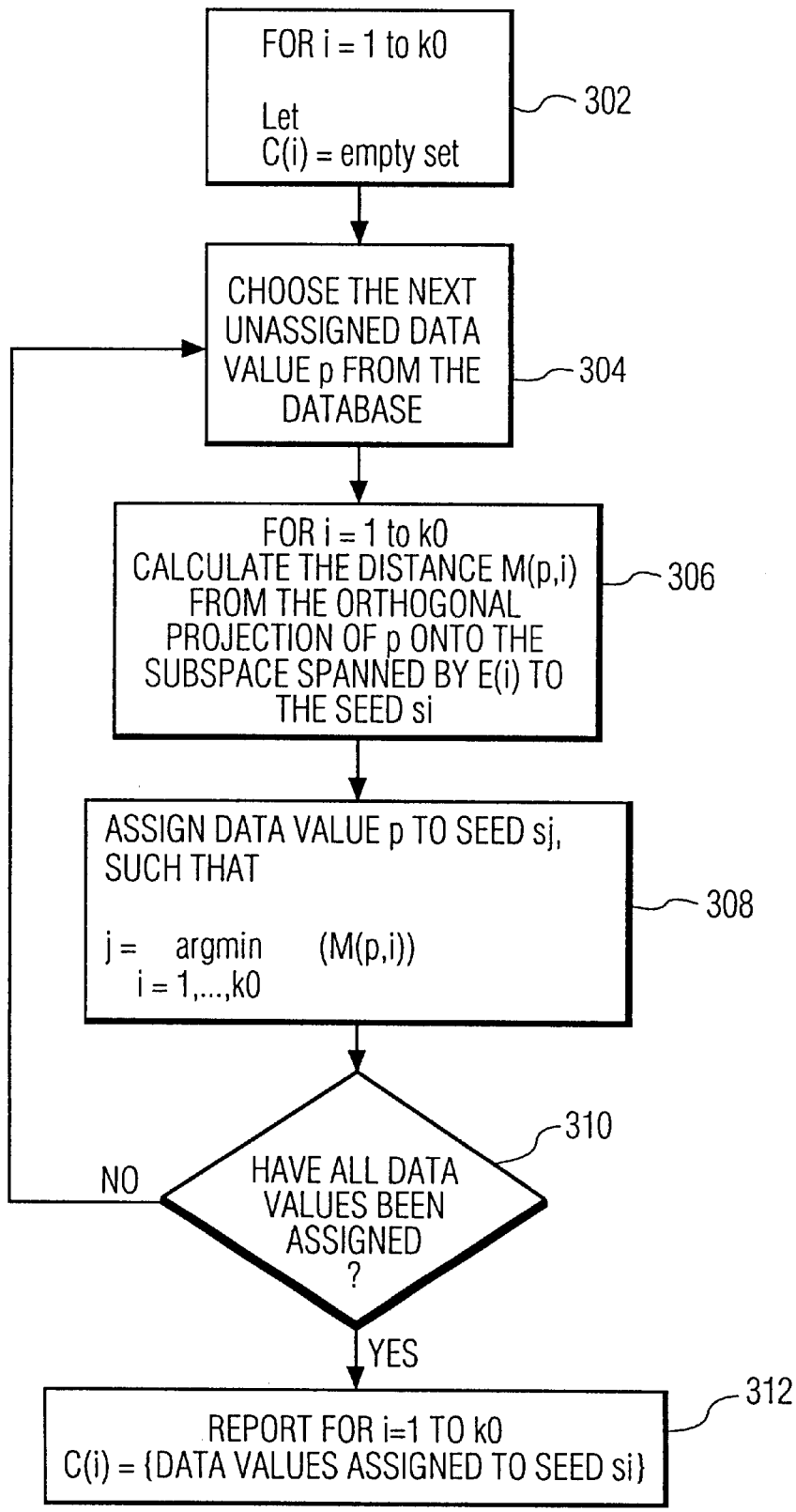
FIG. 3 is a flowchart diagram illustrating a recipe for generating a set of clusters in accordance with an exemplary embodiment of the present invention.

FIG. 3 is a flowchart diagram illustrating a recipe for generating a set of clusters given a set of seeds S and a corresponding set of orientations in accordance with an exemplary embodiment of the present invention. Suppose a set of seeds $S=\{s_1, \ldots, s_{k0}\} \subseteq V$ and a corresponding set of orientations $\{E'_1, \ldots, E'_{k0}\}$ are given. In step 302 each of the clusters C(1) through C(k0) may be defined to be empty sets (i.e. $C(i)=\emptyset$, $i \in \{1, \ldots, k0\}$). In step 304 the next (yet) unassigned data value in a data base, say p, may be chosen.

In step 306 a distance may be calculated from the orthogonal projection of p onto the subspace spanned by E(i) to the seed $s_i$. Without loss of generality, suppose that E(i) is an orthogonal basis for a $\overline{m}$-dimensional subspace, i.e. $E(i)=\{u_1, \ldots, u_{\overline{m}}\}$. The orthogonal projection $\overline{p}$ of p onto the subspace spanned by E(i) may be calculated as follows $$\overline{p} = Tp, \quad R = \sum_{j=1}^{\overline{m}} u_j u_j^T \qquad (5)$$

The distance between p and $s_i$ in the subspace spanned by E(i) is given by $M(p,i)=\|\overline{p}-\overline{s}_i\|$, where $\|.\|$ is a predetermined distance metric. Thus, in step 306 the distance M(p,i) may be calculated for each $i \in \{1, \ldots, k0\}$.

In step 308 data value p may be assigned to a seed $s_j$. Data value p may be assigned to a seed to which it is "closest" in the sense that $$j = \underset{i \in \{1, \ldots, k0\}}{\mathrm{argmin}} (M(p, i)) \qquad (6)$$

In step 310 a determination may be made whether every data value in the database (with the possible exception of outliers) has been assigned to some seed in the set of seeds S. If it is determined that some data values have not yet been assigned to a seed, then step 304, 306, 308, and 310 may be repeated. If every data value in the database (with the possible exception of outliers) has been assigned to some seed, then in step 312 k0 clusters constructed around set S of k0 seeds, namely, C(i) i=1, ..., k0, where $C(i)=\{$data values which are assigned to seed $s_i\}$. Note that the recipe given in FIG. 3 may be used to partition data values into clusters even when a set of a set of seeds S and a corresponding set of orientations are not provided. The set of S seeds may be chosen, for example, randomly from a set of data values V stored in a database. Further, each orientation E(i) may be chosen, for example, to be the set of standard orthonormal basis for $\Re$, i.e. the set $\{e_1, \ldots, e_n\}$, where $e_1=(1, 0, \ldots, 0)$, $e_2=(0, 1, \ldots, 0)$, ..., $e_1=(0, \ldots, 0, 1)$.

In step 208 a respective orientation may be calculated for each cluster constructed in step 206. In other words, a set of vectors in the data space of the data values may be calculated for each cluster constructed in step 206. The set of vectors calculated for each cluster define an oriented subspace in the data space. Thus, clusters constructed in step 206 combined with corresponding orientations calculated in step 208 form a set of oriented clusters.

Figure 4:
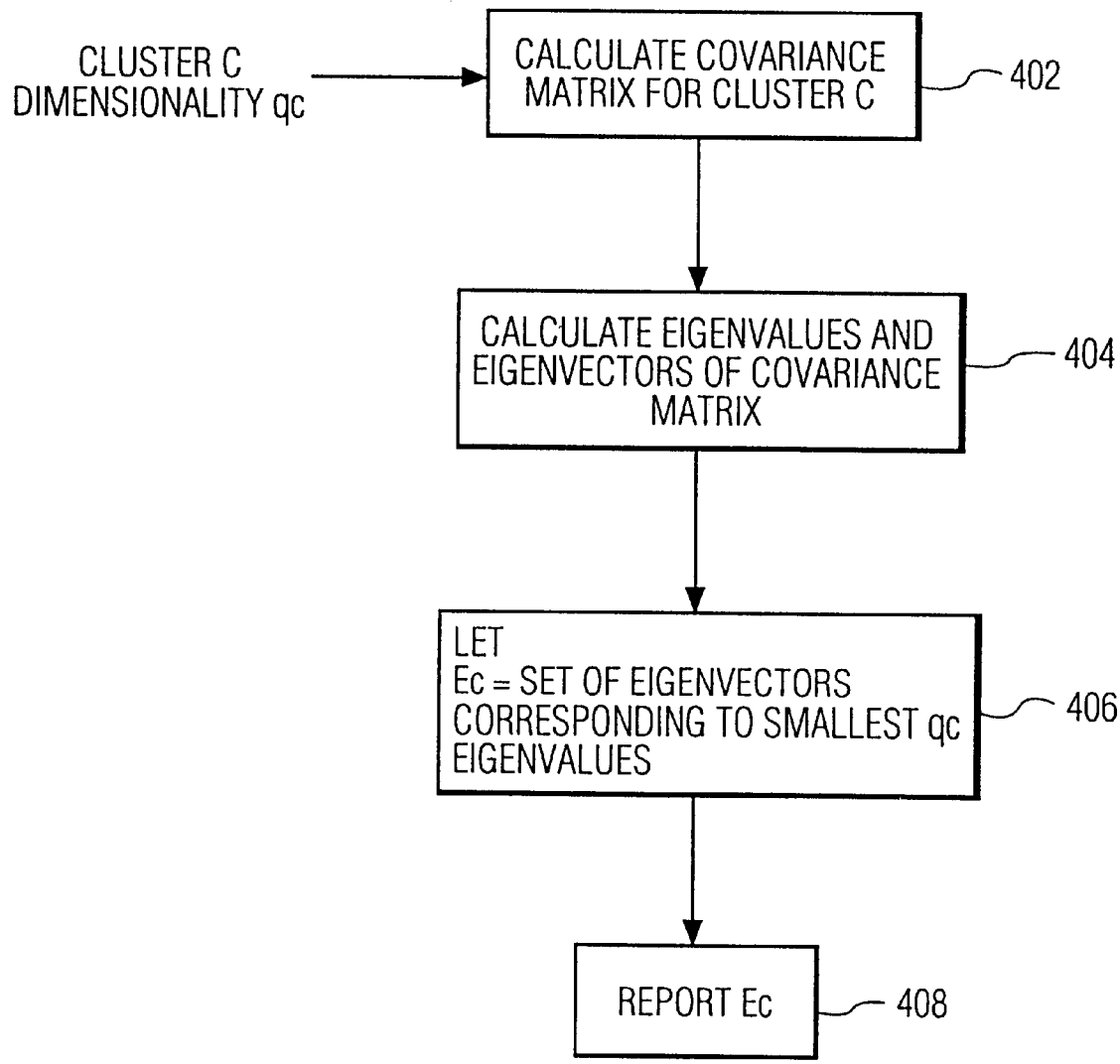
FIG. 4 is a flowchart diagram illustrating a recipe for calculating the orientation of a cluster of data values in accordance with an exemplary embodiment of the present invention.

FIG. 4 is a flowchart diagram illustrating a recipe for calculating the orientation of a cluster of data values in accordance with an exemplary embodiment of the present invention. Suppose that cluster C can be written as $\{x_i \in \Re : i=1, \ldots, m\}$, i.e. cluster C includes m data values in an n dimensional data-space. Write $x_i = \{x_{i1}, x_{i2}, \ldots, x_{in}\}^T$, for $1 \leq i \leq m$. Define row vectors $c_i = \{x_{1i}, x_{2i}, \ldots, x_{mi}\}$, for $1 \leq i \leq n$, and let $$\bar{c} = \frac{1}{n} \sum_{i=1}^{n} c_i.$$

In step 402 the covariance matrix for cluster C may be calculated. The covariance matrix for cluster C may be calculated as follows $$\begin{pmatrix} cov(c_1, c_1) & cov(c_1, c_2) & \ldots & cov(c_1, c_n) \\ cov(c_2, c_1) & cov(c_2, c_2) & \ldots & cov(c_2, c_n) \\ \vdots & \vdots & & \vdots \\ cov(c_n, c_1) & cov(c_n, c_2) & \ldots & cov(c_n, c_n) \end{pmatrix} \quad (7)$$

where $cov(c_i, c_j) = (c_i - \bar{c})(c_j - \bar{c})^T$. An exemplary implementation of a calculation of a covariance matrix is described below.

In step 406 both the Eigenvalues and Eigenvectors of the covariance matrix may be calculated. By the Principal Axes Theorem, a (real) symmetric matrix (of order n) has n real Eigenvalues and n corresponding real Eigenvectors that form an orthonormal basis of $\Re$. The Eigenvectors may either be derived from a constructive proof of the Principal Axes Theorem, or, for example, by use of Singular Value Decomposition (SVD). In step 408 the orientation of cluster C may be chosen to be the set $E_c$ of Eigenvectors corresponding to the smallest $q_c$ of the n Eigenvalues of the covariance matrix. Thus, the set $E_c$ forms an orthonormal basis for a (oriented) subspace of $\Re$. In step 408 $E_c$, the orientation of cluster C, may be reported.

The technique illustrated in FIG. 4 is reminiscent of the so-called Latent Semantic Indexing technique (LSI) for document data applications. LSI may be used to transform data into a new coordinate system in which the (second order) correlations in the data are minimized. LSI, however, primarily addresses problems of reducing dimensionality for the entire data set. Therefore, using LSI, the Eigenvectors of the covariance matrix with maximum spread may be chosen in order to retain information which distinguishes data values one from another. When dealing with clustering, however, Eigenvectors with the least spread may be chosen so as to retain information about the "similarity" of data values within a cluster.

Implementation of the co-variance matrix calculation

One exemplary approach to calculating a covariance matrix relies on the concept of an extended Cluster Feature vector (CF-vector). An extended CF-vector may be associated with each cluster. An extended CF-vector may include $n^2 + n + 1$ entries. Let C be a cluster in data space. Three types of entries may be included in an extended CF-vector:

1. $n^2$ entries corresponding to each pair of coordinates (i.e. $\{(i,j) : i, j \in \{1, \ldots, n\}\}$). For each pair of coordinates (i,j) an entry $$CF1^C_{(i,j)} = \sum_{x \in C} x_i x_j$$

may be included in an extended CF-vector. Let $$\overline{CF1^C} = \{CF1^C(i,j) : i, j \in \{1, \ldots, n\}\}.$$

2. n entries corresponding to each coordinate $i \in \{1, \ldots, n\}$. For each coordinates i an entry $$CF2^C_i = \sum_{x \in C} x_i$$

may be included in an extended CF-vector.

$$\overline{CF2^C} = \{CF2_C : i \in \{1, \ldots, n\}\}.$$

3. 1 entry corresponding to the mass of cluster C, say $CF3^C$.

Thus, an extended CF-vector corresponding to a cluster C may be denoted by $\overline{CF^C} = (\overline{CF1^C}, \overline{CF2^C}, CF3^C)$. The following are helpful properties of an extended CF-vector:

1. A covariance matrix (e.g. the matrix given in (7) above) may be derived using an extended CF-vector. In particular, the entry of a covariance matrix at the $i^{th}$ row and $j^{th}$ column may be calculated by $$CF1^C_{(i,j)}/CF3^C - CF2^C_i \cdot CF2^C_j/(CF3^C)^2 \quad (8)$$

2. An extended CF-vector satisfied an additive property. In other words, an extended CF-vector for the union of two clusters is equal to the sum of the extended CF-vectors corresponding to the two clusters.

Therefore, it may be advantageous to calculate covariance matrices using an extended CF-vector. For example, a covariance matrix for merged clusters (see FIG. 6 and description below) may be calculated with greater ease using the sum of extended CF-vectors.

ITERATIVE METHOD FOR DETECTING ORIENTED CLUSTERS

Figure 5:
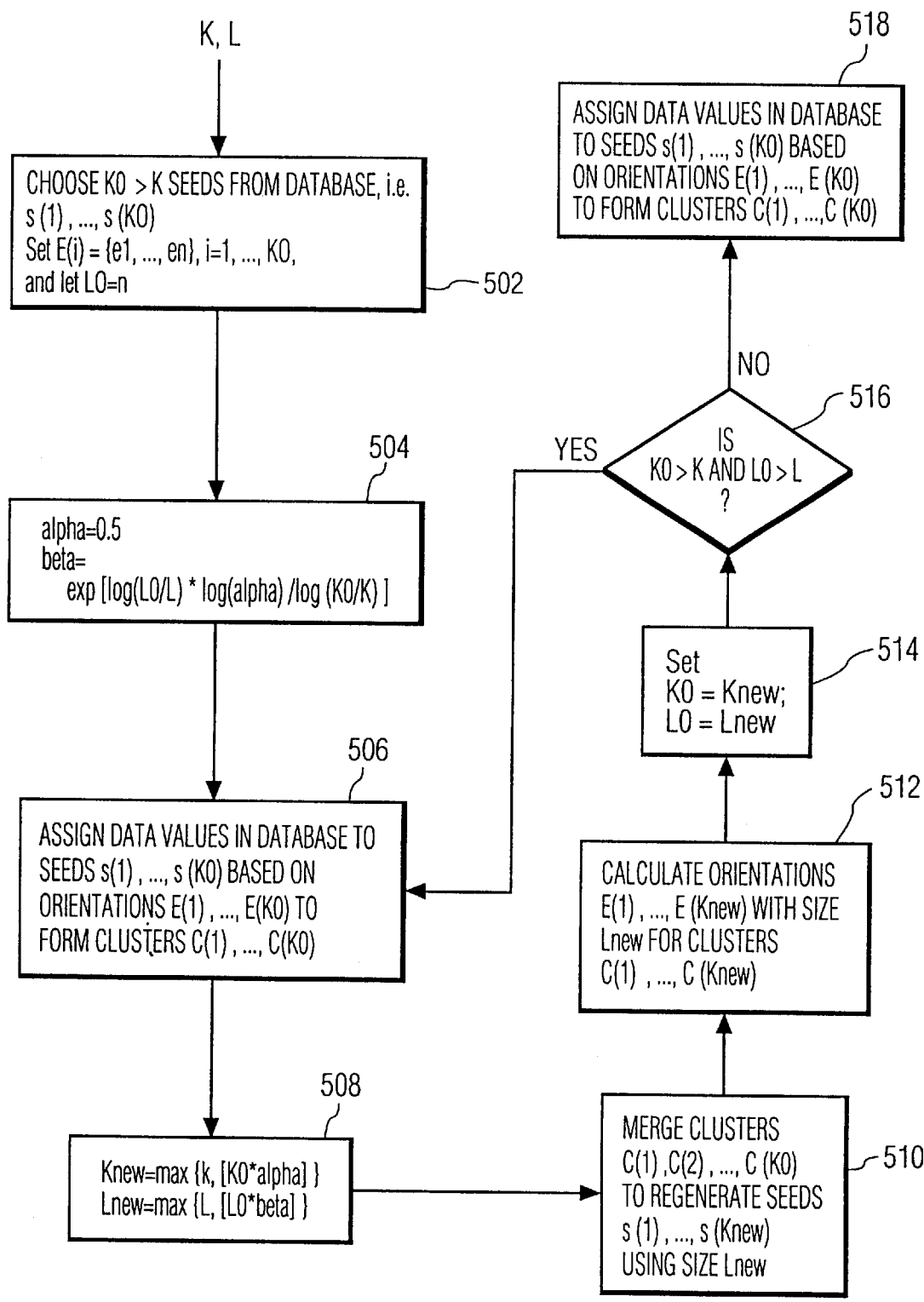
FIG. 5 is a flow chart diagram illustrating an iterative method for detecting oriented clusters in accordance with an exemplary embodiment of the present invention.

FIG. 5 is a flow chart diagram illustrating an iterative method for detecting oriented clusters in accordance with an exemplary embodiment of the present invention. In step 502 K0 data values, say $s(1), \ldots, s(K0)$, may be chosen from the data base. Seeds $s(1), \ldots, s(K0)$ may be chosen based on system performance (e.g. quality of performance or running time). Further, seeds $s(1), s(K0)$ may be chosen, for example, randomly from the set of data values stored in a database. In addition, in step 502 sets E(i), $1 \leq i \leq K0$, may each be initialized to the set $\{e_1, \ldots, e_n\}$ (an orthonormal basis for $\Re$) and the variable L0 may be initialized to n.

In step 504 reduction factors alpha and beta may be defined. Reduction factors alpha and beta may be used to reduce the number of seeds and the dimensionality of associated subspaces, respectively. In fact, alpha determines the rate of reduction in the number of seeds per iteration, and beta determines the rate of reduction of the dimensionality of associated subspaces per iteration. For example, in step 504 alpha may be chosen to be 0.5, while beta may be determined from the equation $$\frac{\text{Log}(K0/K)}{\text{Log}(alpha)} = \frac{\text{Log}(L0/L)}{\text{Log}(beta)} \text{ or} \quad (9)$$

$$beta = \exp\left[\frac{\text{Log}(L0/L) * \text{Log}(alpha)}{\text{Log}(K0/K)}\right]$$

Of course many other choices of reduction factors are possible. It is desirable, however, to choose reduction factors in order to reduce the number of seeds and dimensionality of associated subspaces, from iteration to iteration, from K0 towards K and from L0 towards L.

In step 506 each data value in a database may be assigned to a seed (i.e. to one of s(1), . . . , s(K0)), thereby No forming clusters C(1), . . . , C(K0). Clusters C(1), . . . , C(K0) may be formed, for example, using the recipe illustrated in FIG. 3 using corresponding orientations E(1), . . . , E(K0). In step 508 the variable $K_{new}$ is set to max{K, [K0*alpha]}, and the variable $L_{new}$ to max{L, [L0*beta]}, where the notation is '[a]' indicates rounding a real number 'a' to the nearest integer. In the current iteration, the number of seeds may be reduced from K0 to $K_{new}$ and the dimensionality of associated subspaces may be reduced from L0 to $L_{new}$. The inclusion of the max function in the determination of variables $K_{new}$ and $L_{new}$ ensures that the number of seeds is not reduced below the desirable value of K, and that the dimensionality of associated subspaces is not reduced below the desirable value of L.

Figure 6:
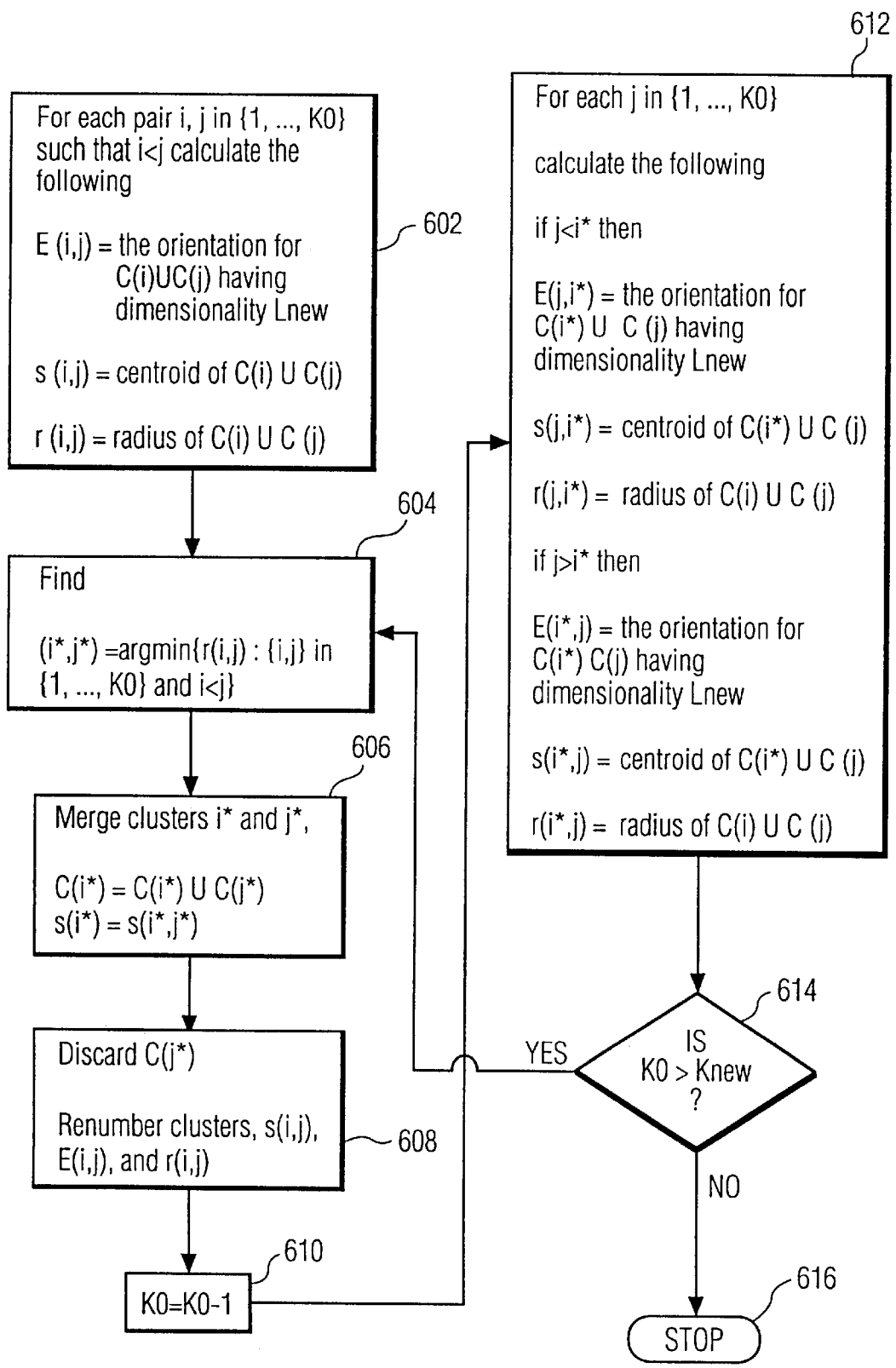
FIG. 6 is a flow chart diagram illustrating a recipe for merging oriented clusters in accordance with an exemplary embodiment of the present invention.

In step 510 clusters formed in step 506, namely C(1), . . . , C(K0) with orientations E(1), . . . , E(K0), may be merged to determine a new set of seeds s(1), . . . , s($K_{new}$). FIG. 6 is a flow chart diagram illustrating a recipe for merging oriented clusters in accordance with an exemplary embodiment of the present invention. In step 602 for each pair of indexes i,j∈{1, . . . , K0} such that i<j the following may be calculated for a cluster C(i)∪C(j):

1. an orientation E(i,j), corresponding to C(i)∪C(j), may be calculated by, for example, the recipe given in FIG. 4 using dimensionality $L_{new}$;
2. a centroid s(i,j) of C(i)∪C(j); and
3. a radius r(i,j), with respect to E(i,j), of C(i)∪C(j), i.e.

$$r(i, j) = \frac{1}{|C(i) \cup C(j)|} \sum_{p \in C(i) \cup C(j)} \|p - s(i, j)\|_{E(i,j)},$$

where |C(i)∪C(j)| is the mass of C(i).

In step 604 the smallest value r* of r(i,j) such that i,j ∈{1, . . . , K0} and i<j may be detected. The indexes i* and j*, r(i*,j*)=r* may also be detected, i.e. (i*,j*)=argmin{r(i, j):{i, j} in {1, . . . , K0} and i<j}.

In step 606 the cluster indexed by i* and the cluster indexed by j* are merged by letting C(i*)=C(i*)∪C(j*). Further, the centroid of C(i*) may be assigned the value s(i*,j*) computed in step 602. Merging the clusters indexed by i* and the cluster indexed by j* amounts to, roughly speaking, combining two clusters of the existing K0 clusters into one, thereby reducing the number of clusters.

In step 608 cluster C(j*) may be deleted from the set of clusters C(1), . . . , C(K0). Further, clusters C(i), centroids s(i,j), and radii r(i,j) having indexes which are greater than j* may be renumbered by decrementing such indexes by 1. In step 610 the value of K0 may be reset to K0−1.

Once clusters i* and j* are merged the following may be recomputed in step 612 for each j∈{1, . . . , K0}:

1. an orientation E(j,i*) if j<i*, and E(i*,j) if i*<j, corresponding to C(i*)∪C(j), may be calculated by, for example, the recipe given in FIG. 4 using dimensionality $L_{new}$;
2. a centroid of C(i*)∪C(j), s(j,i*) if j<i*, and s(i*,j) if i*<j; and
3. a radius of C(i*)∪C(j), r(j,i*) with respect to E(j,i*) if j<i*, and r(i*,j) with respect to E(i*,j) if i*<j.

In step 614 a determination may be made whether K0>$K_{new}$. If K0>$K_{new}$ then steps 604, 606, 608, 610, and 612 may be repeated in order to merge clusters and further reduce the number of clusters. If K0≦K then in step 616 the procedure for merging oriented clusters may terminate. The centroids, s(1), . . . , s($K_{new}$), of the $K_{new}$ clusters generated after merging as described, for example, in the foregoing, may serve as a new set of regenerated seeds.

In step 512 of FIG. 5 a set of orientations, E(1), . . . , E($K_{new}$) with dimensionality $L_{new}$, corresponding to clusters C(1), . . . , C($K_{new}$) may be calculated. In step 514 K0is set to $K_{new}$, and L0 is set to $L_{new}$. In step 516 a determination may be made whether K0>K and L0>L. If it is determined in step 516 that K0>K and L0>L then steps 506, 508, 510, 512, and 514 may be repeated. If it is determined in step 516 that K0≦K or L0≦L, then in step 518 data values in the database may be assigned to K0 clusters based on seeds s(1), . . . , s(K0) and orientations E(1), E(K0), having dimensionality L0, to form clusters C(1), C(K0). Data values in the database may be assigned to seeds s(1), . . . , s(K0) using, for example, the recipe illustrated in FIG. 3.

Note that it may be desirable, in addition to merging clusters, to discard in each iteration of the method illustrated in FIG. 5 some clusters which contain a relatively small number of data values. For example, a given percentage of seeds corresponding to clusters containing a relatively small number of data values may be discarded in each iteration. Data values of clusters containing a relatively small number of data values may be considered to be "outliers".

E-COMMERCE APPLICATIONS

The following definitions are helpful in understanding e-commerce applications:

e-commerce: e-commerce denotes Electronic Commerce. Electronic commerce refers to the process of to trading goods and commodities by electronic means, for example, purchases made over the Internet. The increasing popularity of the Internet has made e-commerce applications of commercial importance. One aspect e-commerce applications is the availability of transaction histories for customers. Databases may be maintained for different consumers. The information stored in these databases may be analyzed for the purpose of providing product recommendations to customers concerning, for example, items for sale.

Recommendations: In an e-commerce application it may be desirable to predict the purchasing characteristics of individual customers. Purchasing behavior predictions may be made by analyzing information stored in a database of data values. Computer technology enables databases of information regarding a customer's transaction history to be maintained. It may be desirable, for example for marketing purposes, to predict the types of products which may be preferred by a customer. Information stored in customer transaction databases may be analyzed to detect customers that exhibit "similar" purchasing behavior. The set of customers who are similar to a given target customer is referred to as a "peer group". Based on the purchasing behavior of the "peer group" it may be possible to predict the types of products which may be preferred by a target customer. The predicted (preferred) items may be provided to the target customer as a list of recommended items.

Promotion list: A promotion list is a list of items used to restrict the number of products which may be recommended to a target customer. For example, although a hundred thousand items may be offered for sale by a retail organization, it may be desirable to restrict the recommended items to one hundred of the items. This restricted list is referred to as a promotion list. A promotion list may be used, for example, in order to promote the sale of specific products.

Peer group: A peer group is a group of data values "similar" to a given target value. For example, each data value may correspond to a transaction or purchase (transactions or purchases) made by a customer. A data value corresponding to a transaction may include information on items for sale, quantities of items for sale, numbers of items purchased belonging to various product categories, or frequency of purchase of items for sale. As a peer group is "similar" to a given target value, the purchasing patterns of the peer group may be used to make recommendations.

Figure 7:
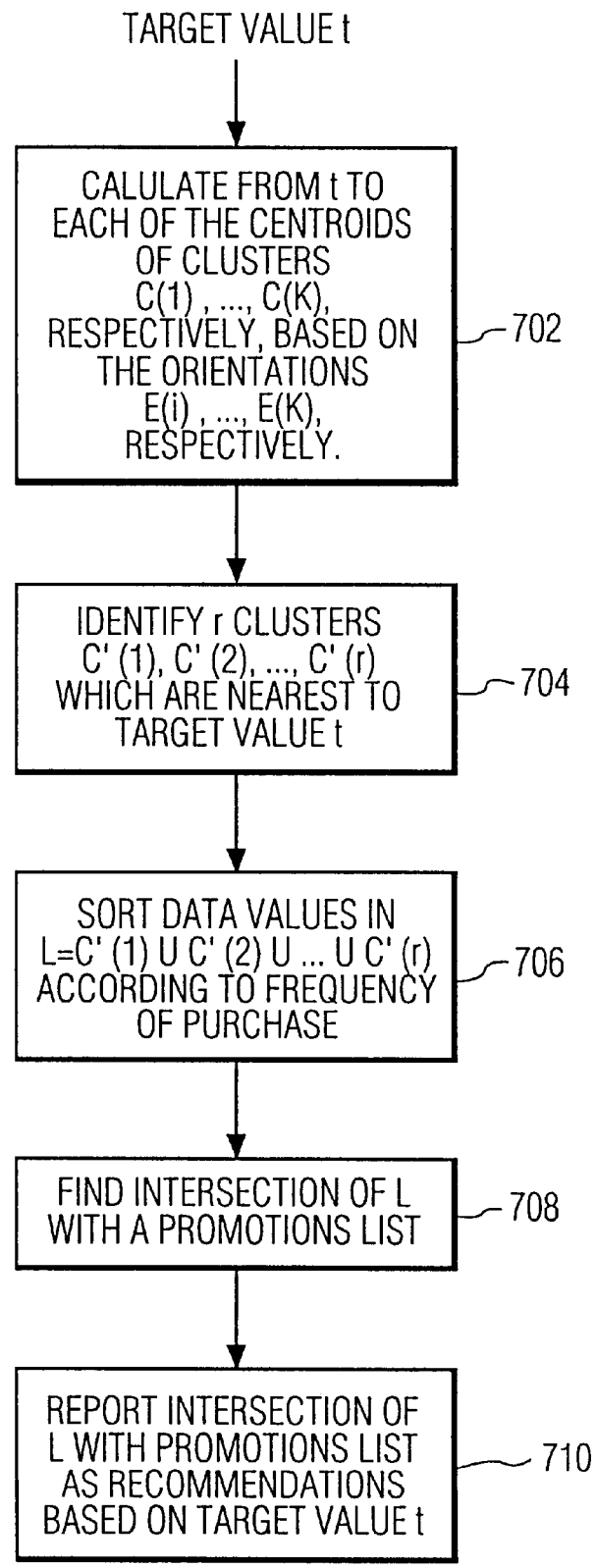
FIG. 7 is a flow chart diagram illustrating an exemplary e-commerce application in accordance with an exemplary embodiment of the present invention.

FIG. 7 is a flow chart diagram illustrating an exemplary e-commerce application in accordance with an exemplary embodiment of the present invention. A user may provide a target data value t. The target data value may include information about a given customer and her/his purchasing behavior. For example, the target value may include a list of items purchased by a given customer, the price of the item, the frequency of purchase and other information relating to an item for sale or describing a purchasing customer.

In step 702 distances from target value t to each centroid $S(1), \ldots, S(K)$, respectively, of K oriented clusters $C(1), \ldots, C(K)$ (with orientations $E(1), \ldots, E(K)$) may be calculated. In other words, quantities $$M(t,i) = \|t-s(i)\|_{E(i)} = \|\bar{t}-\bar{s}(i)\| \text{ for } i=1, \ldots, K,$$

may be calculated. In step 704 the nearest r clusters to target value t may be identified. The r clusters nearest to target value t, say $C'(1), \ldots, C'(r)$, may be identified by finding the largest r values of $M(t,i)$, $i \in \{1, \ldots, K\}$. The value of r may be a predetermined system parameter which is set, for example, by a user.

In step 706 data values in the union of clusters $$\bigcup_{i=1}^{r} C'(i)$$

may be sorted according to, for example, frequency of purchase (by a given customer) of an item or items included in each data value. In step 708 the sorted set of data values in $C'(1) \cup C'(2) \cup \ldots \cup C'(r)$, say L, may be intersected with a promotions list. A promotions list may be, for example, a list of preferred items provided by a manufacturer or distributor of items for sale. In step 710 the data values in the intersection of L with a promotions list may be reported to a user as recommended items in a peer group of target data value t. The data values in the intersection of L with a promotions list may, for example, be reported to a user in order of frequency of purchase.

Although illustrated and described herein with reference to certain exemplary embodiments, the present invention is nevertheless not intended to be limited to the details shown. Rather, various modifications may be made in the details within the scope and range of equivalents of the claims and without departing from the spirit of the invention.

What is claimed:

1. A method of analyzing information in the form of a plurality of data values which represent a plurality of objects, the plurality of data values distributed in a data space, said method comprising the steps of:

(a) identifying a set of features which characterize each of the plurality of objects;

(b) storing the plurality of data values in a database, each of the plurality of data values corresponding to at least one of the plurality of objects based on the set of features;

(c) partitioning ones of the plurality of data values stored in the database into a plurality of clusters;

(d) calculating a respective orientation associated with a position in data space of data values which are contained in each respective cluster of the plurality of clusters based on the set of features;

(h) merging one cluster with an other cluster of the plurality of clusters based on a radius of a union of data values which are contained in the one cluster and the data values which are contained in the other cluster; and (i) generating a new plurality of clusters based on the result of step (h).

2. A method of analyzing information according to claim 1, wherein ones of the plurality of data values are partitioned into K clusters.

3. A method of analyzing information according to claim 1, wherein the respective orientation associated with each respective cluster includes an orthonormal basis of a subspace of the data space, the subspace having dimensionality L.

4. A method of analyzing information according to claim 1, wherein step (c) further includes the steps of:

(e) choosing a plurality of seeds from the plurality of data values;

(f) calculating a distance between any one of the plurality of data values and each of the plurality of seeds; and (g) assigning the ones of the plurality of data values to the plurality of seeds based on the distance.

5. A method of analyzing information according to claim 1, further comprising the steps of:

(j) calculating a new respective orientation associated with a position in data space of data values which are contained in each respective new cluster of the plurality of new clusters based on the set of features; and (k) generating a plurality of seeds, each respective seed of the plurality of seeds corresponding to each respective new cluster of the plurality of clusters.

6. A method of analyzing information according to claim 5, further comprising the steps of:

(l) calculating a distance between any one of the plurality of data values and each of the plurality of seeds based on the new respective orientation; and (m) repeating step (c) by assigning the ones of the plurality of data values to the plurality of seeds based on the distance.

7. A method of analyzing information according to claim 5, wherein the plurality of seeds are generated by calculating a respective centroid associated with each respective new cluster.

8. A method of analyzing information according to claim 1, wherein the respective orientation is calculated by choosing ones of a plurality of eigenvalues of a covariance matrix of data values which are contained in each respective cluster.

9. The method of analyzing information according to claim 1, wherein the plurality of data values represent a plurality of transactions associated with a plurality of customers and a plurality of items for sale.

10. The method of analyzing information according to claim 1, further comprising the steps of:

providing a target value;

calculating a respective distance between the target value and each respective cluster based on each respective orientation; and selecting r clusters of the plurality of clusters based on the respective distance.

11. The method of analyzing information according to claim 10, wherein the r clusters comprise a peer group of the target value which is recommended to a user.

12. The method of analyzing information according to claim 10, further comprising the step of determining an intersection of a set of data values contained by the r clusters selected with a promotions list.

13. The method of analyzing information according to claim 12, wherein the intersection of data values contained by the r clusters with the promotions list comprise a peer group of the target value which is recommended to a user.

14. An article of manufacture comprising a computer useable medium having computer readable program code means embodied therein for analyzing information in the form of a plurality of data values which represent a plurality of objects, the plurality of data values distributed in a data space, the computer readable program code means in said article of manufacture comprising computer readable program code means for causing a computer to effect:

(a) identifying a set of features which characterize each of the plurality of objects;

(b) storing the plurality of data values in a database, each of the plurality of data values corresponding to at least one of the plurality of objects based on the set of features;

(c) partitioning ones of the plurality of data values stored in the database into a plurality of clusters;

(d) calculating a respective orientation associated with a position in data space of data values which are contained in each respective cluster of the plurality of clusters based on the set of features;

(h) merging one cluster with an other cluster of the plurality of clusters based on a radius of a union of data values which are contained in the one cluster and the data values which are contained in the other cluster; and (i) generating a new plurality of clusters based on the result of step (h).

15. An article of manufacture as recited in claim 14, wherein the plurality of data values represent a plurality of transactions associated with a plurality of customers and a plurality of items for sale.

16. An article of manufacture as recited in claim 14, the computer readable program code means in said article of manufacture further comprising computer readable program codes means for causing a computer to effect:

providing a target value;

calculating a respective distance between the target value and each respective cluster based on each respective orientation; and selecting r clusters of the plurality of clusters based on the respective distance.

17. An article of manufacture as recited in claim 14, wherein the respective orientation associated with each respective cluster includes an orthonormal basis of a subspace of the data space.

18. An article of manufacture as recited in claim 16, wherein the r clusters comprise a peer group of the target value which is recommended to a user.

19. A program storage device readable be machine, tangibly embodying a program of instructions executable by the machine to perform method steps for analyzing information in the form of a plurality of data values which represent a plurality of objects, the plurality of data values distributed in a data space, said method comprising the steps of:

(a) identifying a set of features which characterize each of the plurality of objects;

(b) storing the plurality of data values in a database, each of the plurality of data values corresponding to at least one of the plurality of objects based on the set of features;

(c) partitioning ones of the plurality of data values stored in the database into a plurality of clusters;

(d) calculating a respective orientation associated with a position in data space of data values which are contained in each respective cluster of the plurality of clusters based on the set of features;

(h) merging one cluster with an other cluster of the plurality of clusters based on a radius of a union of data values which are contained in the one cluster and the data values which are contained in the other cluster; and (i) generating a new plurality of clusters based on the result of step (h).

20. A program storage device as recited in claim 19, wherein the respective orientation associated with each respective cluster includes an orthonormal basis of a subspace of the data space.

21. A program storage device as recited in claim 19, wherein the plurality of data values represent a plurality of transactions associated with a plurality of customers and a plurality of items for sale.

22. A program storage device as recited in claim 19, wherein said program of instructions further performs the steps of:

providing a target value;

calculating a respective distance between the target value and each respective cluster based on each respective orientation; and selecting r clusters of the plurality of clusters based on the respective distance.

23. A program storage device as recited in claim 22, wherein the r clusters comprise a peer group of the target value which is recommended to a user.

24. A computer program product comprising a computer useable medium having computer readable program code means embodied therein for causing analysis of information in the form of a plurality of data values which represent a plurality of objects, the plurality of data values distributed in a data space, the computer readable program code means in said computer program product comprising computer readable program means for causing a computer to effect:

(a) identifying a set of features which characterize each of the plurality of objects;

(b) storing the plurality of data values in a database, each of the plurality of data values corresponding to at least one of the plurality of objects based on the set of features;

(c) partitioning ones of the plurality of data values stored in the database into a plurality of clusters;

(d) calculating a respective orientation associated with a position in data space of data values which are contained in each respective cluster of the plurality of clusters based on the set of features;

providing a target value;

calculating a respective distance between the target value and each respective cluster based on each respective orientation; and selecting r clusters of the plurality of clusters based on the respective distance.

25. A computer program product as recited in claim 24, wherein the respective orientation associated with each respective cluster includes an orthonormal basis of a subspace of the data space.

26. A computer program product as recited in claim 24, wherein the r clusters comprise a peer group of target values which is recommended to a user.

27. A computer program product as recited in claim 24, wherein the plurality of data values represent a plurality of transactions associated with a plurality of customers and a plurality of items for sale.

\* \* \* \* \*